(12) United States Patent
Kim (10) Patent No.: US 8,404,380 B2
(45) Date of Patent: Mar. 26, 2013

(54) INTER-CONNECTOR BETWEEN UNIT CELLS AND SERIAL CELL

(75) Inventor: Tae-yong Kim, Suwon-si (KR)

(73) Assignee: Samsung SDI Co., Ltd., Yongin, Gyeonggi-do (KR)

( * ) Notice: Subject to any disclaimer, the term of this patent is extended or adjusted under 35 U.S.C. 154(b) by 1235 days.

(21) Appl. No.: 12/017,275

(22) Filed: Jan. 21, 2008

(65) Prior Publication Data

US 2008/0182162 A1 Jul. 31, 2008

(30) Foreign Application Priority Data

Jan. 25, 2007 (KR) .................. 10-2007-0007976

(51) Int. Cl.
*H01M 2/24* (2006.01)
(52) U.S. Cl. ......... 429/160; 429/149; 429/158; 429/161
(58) Field of Classification Search .................. 429/149, 429/160, 161, 158
See application file for complete search history.

(56) References Cited

U.S. PATENT DOCUMENTS

| | | | |
|---|---|---|---|
| 4,158,802 A | 6/1979 | Rose, II | |
| 4,470,652 A | 9/1984 | Schwab | |
| 4,724,189 A | 2/1988 | Chase | |
| 4,736,921 A | 4/1988 | Zane et al. | |
| 5,677,079 A | 10/1997 | DeZorzi | |
| 5,733,674 A | 3/1998 | Law | |
| 5,900,332 A | 5/1999 | Marukawa et al. | |
| 2005/0070164 A1 | 3/2005 | Mita et al. | |
| 2006/0078789 A1 | 4/2006 | Wegner | |
| 2006/0270277 A1 | 11/2006 | Zhao et al. | |
| 2007/0141452 A1 | 6/2007 | Kim | |
| 2009/0072785 A1 | 3/2009 | Moon | |
| 2009/0123819 A1 | 5/2009 | Kim | |
| 2009/0123820 A1 | 5/2009 | Han | |
| 2009/0202897 A1 | 8/2009 | Kim et al. | |
| 2010/0119928 A1 | 5/2010 | Yoon | |
| 2010/0178548 A1 | 7/2010 | Baek | |

FOREIGN PATENT DOCUMENTS

| | | |
|---|---|---|
| EP | 0084338 | 7/1983 |
| EP | 1 309 019 A2 | 5/2003 |
| EP | 1498964 | 1/2005 |
| EP | 1 746 679 A1 | 1/2007 |
| EP | 1 705 743 B1 | 9/2007 |
| GB | 2294578 | 5/1996 |
| JP | 08-293300 | 11/1996 |
| JP | 09-190811 | 7/1997 |
| JP | 10-003950 | 1/1998 |

(Continued)

OTHER PUBLICATIONS

EP Search Report for related EP Application No. 08168712.1-1227, Feb. 4, 2009.

(Continued)

*Primary Examiner* — Jane Rhee
(74) *Attorney, Agent, or Firm* — Knobbe, Martens, Olson & Bear, LLP (57) ABSTRACT

An inter-connector interposed between two serially connected unit cells provides mechanical strength and conductivity to the serial connection between the unit cells. Embodiments of the inter-connector comprise a supporting frame providing mechanical support for the two unit cells; a welding projection for welding the interconnector to a unit cell; and a welding projection surrounding area located between the welding projection and the supporting frame, wherein the supporting frame is thicker than the welding projection surrounding area, and the welding projection is thicker than the welding projection surrounding area.

25 Claims, 6 Drawing Sheets

FOREIGN PATENT DOCUMENTS

| | | |
|---|---|---|
| JP | 10-106533 | 4/1998 |
| JP | 10-270095 | 10/1998 |
| JP | 11-054157 | 2/1999 |
| JP | 11144766 A2 | 5/1999 |
| JP | 2000-106164 | 4/2000 |
| JP | 2000-106170 | 4/2000 |
| JP | 2001-126703 | 5/2001 |
| JP | 2001-155789 | 6/2001 |
| JP | 2001-307695 | 11/2001 |
| JP | 2001-345088 | 12/2001 |
| JP | 2001-345089 | 12/2001 |
| JP | 2002-184385 | 6/2002 |
| JP | 2002-298822 | 10/2002 |
| JP | 2002-352793 | 12/2002 |
| JP | 2002359014 A2 | 12/2002 |
| JP | 2003-109558 | 4/2003 |
| JP | 2003-109675 | 4/2003 |
| JP | 2004-087218 | 3/2004 |
| JP | 2004-227954 | 8/2004 |
| JP | 2005-026219 | 1/2005 |
| JP | 2005-349955 | 12/2005 |
| JP | 2006-127921 | 5/2006 |
| JP | 2006-139987 | 6/2006 |
| JP | 2006-179190 | 7/2006 |
| KR | 1998-026759 | 8/1998 |
| KR | 0176553 | 4/2000 |
| KR | 10-20010036651 | 5/2001 |
| KR | 1020060028057 | 3/2006 |
| KR | 1020060045008 | 5/2006 |
| KR | 10 20060086122 | 7/2006 |
| KR | 10-2006-0104070 | 10/2006 |
| KR | 1020070006956 | 1/2007 |
| KR | 1020070014658 | 2/2007 |
| KR | 10-20070089615 | 8/2007 |
| WO | WO 2007/001345 | 8/2005 |
| WO | WO 2008/093181 | 8/2008 |

OTHER PUBLICATIONS

Office Action for corresponding KR 10-2007-0114939, Sep. 23, 2009.
Office Action from corresponding Korean Application No. 10-2007-0114936, Sep. 23, 2009.
Office Action from related Korean Application No. 10-2007-0114935, Sep. 21, 2009.
U.S. Appl. No. 12/177,789, filed Jul. 22, 2008, Dae-Won Han, Office Action of Feb. 3, 2010 and response, Restriction Requirement of Nov. 16, 2009 and response.
Office Action from Related Application No. KR 10-2008-0098767, dated May 27, 2010.
U.S. Appl. No. 12/177,789, filed Jul. 22, 2008, Dae-Won Han, Final Office Action of Jul. 9, 2010, Office Action of Feb. 3, 2010 and response, Restriction Requirement of Nov. 16, 2009 and response.
Office Action from Corresponding Chinese Application No. 2008100000225.1, May 8, 2009.
Extended Search Report dated Aug. 12, 2010 for corresponding application No. EP 08150025.8-2119/1953849.
Office Action dated Nov. 2, 2010 from JP Application No. 2007-132603 which claims priority to KR-10-2007-0007976.
Notice of Allowance dated Oct. 17, 2008 for corresponding Korean Patent Application No. 10-2007-0007976.

INTER-CONNECTOR BETWEEN UNIT CELLS AND SERIAL CELL

CROSS-REFERENCE TO RELATED APPLICATION

This application claims the benefit of Korean Patent Application No. 10-2007-7976, filed on Jan. 25, 2007, in the Korean Intellectual Property Office, the disclosure of which is incorporated herein by reference.

BACKGROUND

1. Technical Field

This disclosure relates to an inter-connector that is interposed between two serially connected unit cells to provide mechanical strength to and to conductively couple a serial connection between unit cells.

2. Discussion of Related Art

In general, alkali storage batteries—such as nickel-hydride storage batteries, nickel-cadmium storage batteries, etc. or lithium-based storage batteries such as lithium-ion cell, lithium-polymer cell, etc.—are generally manufactured by interposing separators between cathodes and anodes, then helically winding them; coupling current collectors to the ends of the cathodes and the anodes to form electrodes, disposing the electrodes within metallic outer cases, welding lead portions extending from the current collectors to seals; and mounting the seals on openings of the outer cases while interposing insulating gaskets therebetween. Because such an alkali storage battery requires a high output when used for example, as a power source for an electric motor tool or for an electric automobile, etc., storage batteries, have generally been assembled into module cells made by connecting a plurality of individual cells in series. Where storage batteries are used in high output applications, such as powering a large electric motor or an electric automobile, the module cell comprising a plurality of cylindrical unit cells coupled in serial and/or in parallel have been used.

Figure 1:
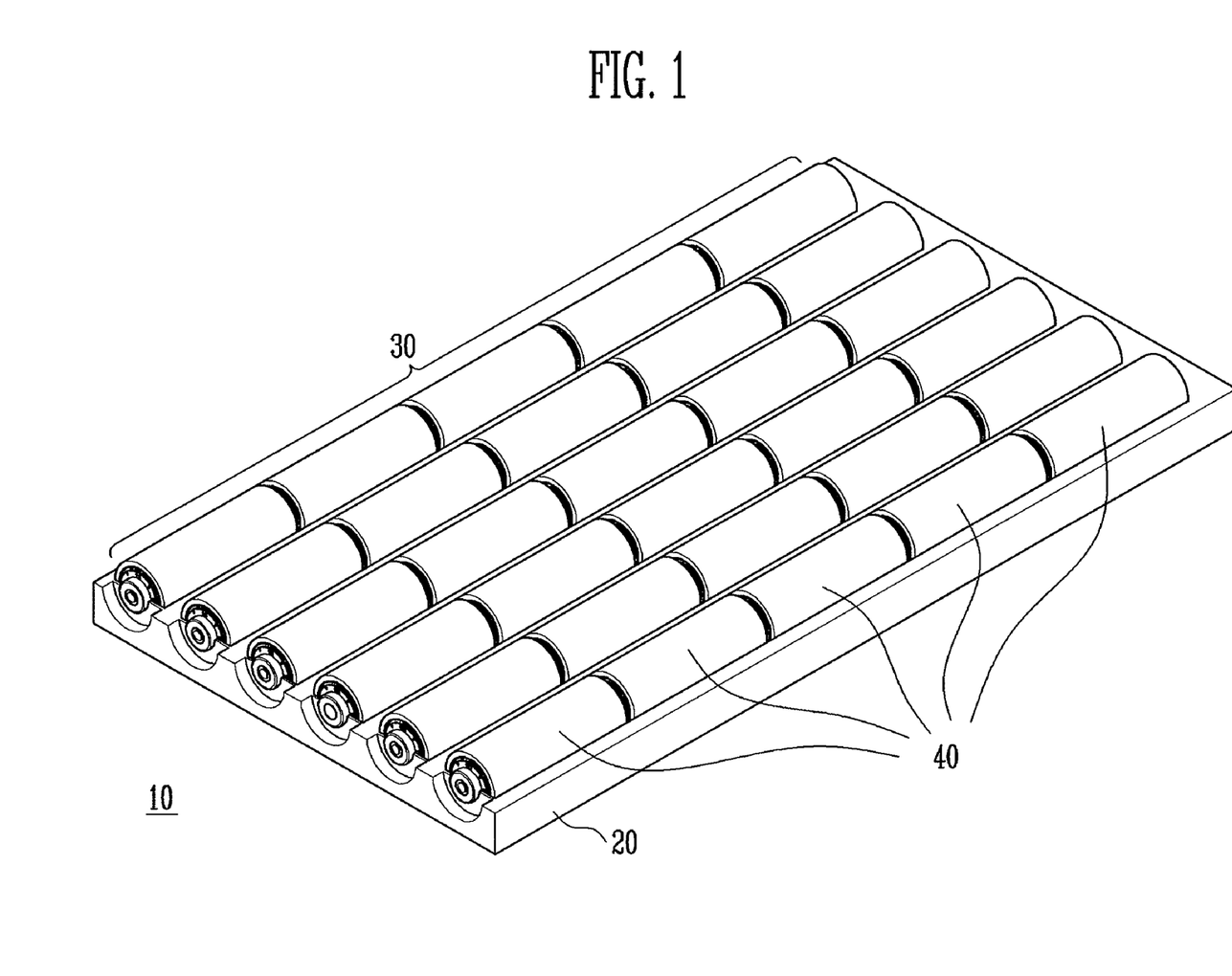
FIG. 1 is a perspective view of an embodiment of a module cell comprising a plurality of cylindrical unit cells in series.

FIG. 1 shows in perspective a plane-frame module cell 10 comprising a parallel arrangement of cylindrical serial cells 30 in a frame 20, the cylindrical serial cells 30 being formed by serially connecting a predetermined number of the cylindrical unit cells 40. Although only a lower frame receiving the cylindrical serial cells 30 is shown in the FIG. 1, there may also be one or more upper frames having structure similar to that of the lower frame stacked therein.

In the cylindrical serial cells 30 shown, a serial inter-connector is interposed between the two serial unit cells 40, forming a serial interface that mechanically and electrically couples the two unit cells 40. When coupling unit cells 30 using an inter-connector, the inter-connector is typically welded to the cathode terminal surface of one unit cell 40 and the outer wall of the other unit cell 40.

Contact resistance welding is commonly used in coupling the inter-connector to the cells because it is useful for welding small objects. Contact resistance welding has some drawbacks, however. To obtain a good quality weld, a welding electrode is preferably contacted with the inter-connector during the welding process. In the serial interface between unit cells 40, welds to the cathode terminal surface or the outer wall of the unit cell are formed from melted portions of the inter-connector. The inter-connector should have sufficient thickness to securely hold the two unit cells together. If the inter-connector is thicker than the outer wall of the unit cell, the current from a welding electrode contacting the inter-connector flows through the inter-connector instead of to the outer wall of the unit cell. Consequently, at best, a poor weld is formed between the inter-connector and unit cell.

Typically the outer wall of a unit cell is not very thick, for example, from about 0.4 T to about 0.5 T. In general, the side wall of the unit cell is about 0.4 T thick and the bottom is about 0.5 T thick. Here, 1 T corresponds to about 1 mm. An inter-connector thinner than the unit-cell outer wall may not have sufficient strength to secure the two unit cells unless expensive metal materials are used in the inter-connector.

SUMMARY OF THE INVENTION

Embodiments of the present invention solve at least one above problems. Some embodiments provide an inter-connector for unit cells having excellent weldability to the unit cell, combined with sufficient strength, as well as a serial cell comprising the same.

Some embodiments provide an inter-connector for unit cells with low cost, excellent weldability, and excellent mechanical strength, as well as a serial cell comprising the same.

Some embodiments provide an inter-connector comprising: a supporting frame providing mechanical strength in order to fix two unit cells; a welding projection to be welded to the unit cells in a contact resistance welding manner; and a welding projection surrounding area located between the welding projection and the supporting frame, wherein the thickness of the supporting frame is thicker than that of the welding projection surrounding area and the thickness of the welding projection is thicker than that of the welding projection surrounding area. Comparing the thickness of the welding projection and the welding projection surrounding area with that of the outer wall of the unit cell, it is preferable to make the thickness of the supporting frame thicker than that of the outer wall of the unit cell and the thickness of the welding projection surrounding area equal to or thinner than that of the outer wall of the unit cell.

Other embodiments provide an inter-connector connecting a first unit cell to a second unit cell in series comprising: a fixing wall having the outer wall of the first unit cell inserted into the inside thereof and a first welding projection to be welded to the first unit cell in a contact resistance welding manner; a first supporting surface successively formed on the fixing wall and supporting a second electrode surface of the first unit cell; and a second supporting surface supporting a first electrode surface of the second unit cell, wherein the thickness of at least welding projection surrounding area in the fixing wall is equal to or thinner than that of the anode outer wall of the unit cell.

Other embodiments provide an inter-connector connecting a first unit cell to a second unit cell in series comprising: a fixing wall having the outer wall of the first unit cell inserted into the inside thereof; a first supporting surface successively formed on the fixing wall and supporting a second electrode surface of the first unit cell; and a second supporting surface supporting a first electrode surface of the second unit cell and having a welding projection to be welded to the second unit cell in a contact resistance welding manner, wherein the thickness of at least welding projection surrounding area in the second supporting surface is equal to or thinner than that of the anode outer wall of the unit cell.

Embodiments of a serial cell equipped the inter-connector further comprise: two or more unit cells; and an inter-connector connecting a first unit cell and a second unit cell between the lower part of the first unit cell of the two or more unit cells and the upper part of the second unit cell neighboring the first unit cell. Embodiments of the inter-connector comprise: a supporting frame providing mechanical strength in order to fix the first unit cell and the second unit cell; a welding projection to be welded to the first unit cell or the second unit cell; and a welding projection surrounding area located between the welding projection and the supporting frame, wherein the thickness of the supporting frame is thicker than that of the welding projection surrounding area and the thickness of the welding projection is thicker than that of the welding projection surrounding area.

Some embodiments provide an inter-connector comprising: a supporting frame dimensioned and configured to mechanically couple two unit cells; a welding projection operable to be welded to the unit cells; and a welding projection surrounding area disposed between the welding projection and the supporting frame. At least a portion of the supporting frame is thicker than the welding projection surrounding area, and at least a portion of the welding projection is thicker than the welding projection surrounding area.

In some embodiments, the at least a portion of the supporting frame is thicker than an outer wall of a unit cell and a thickness of the welding projection surrounding area equal to or thinner than the outer wall of the unit cell. In some embodiments, a ratio of a height to a width of the welding projection is from about 15% to about 20%.

In some embodiments, the two unit cells comprise a first unit cell and a second unit cell, and the inter-connector is dimensioned and configured to couple the first unit cell to the second unit cell in series. In some embodiments, the supporting frame comprises: a fixing wall dimensioned and configured to receive a portion of the first unit cell; a first supporting surface formed on the fixing wall dimensioned and configured to support a surface of an electrode of the first unit cell; and a second supporting surface dimensioned and configured to contact and support a surface of an electrode of the second unit cell. In some embodiments, the welding projection comprises a first welding projection extending inwardly from the fixing wall, and operable to be welded to the first unit cell.

In some embodiments, the electrode surface of the first unit cell comprises an anode, and the electrode surface of the second unit cell comprises a cathode, at least a portion of the fixing wall is thicker than an anode outer wall of the first unit cell, and a thickness of the first welding projection surrounding area is equal to or thinner than the anode outer wall of the first unit cell. In some embodiments, the electrode surface of the first unit cell comprises an anode, the electrode surface of the second unit cell comprises a cathode, and a thickness of the fixing wall is equal to or thinner than that of an anode outer wall of the unit cell.

In some embodiments, the welding projection comprises a second welding projection formed on the second supporting surface, and operable to be welded to the second unit cell. In some embodiments, the electrode surface of the first unit cell comprises an anode, and the electrode surface of the second unit cell comprises a cathode, a thickness of the second welding projection surrounding area is equal to or thinner than the cathode outer wall of the second unit cell.

In some embodiments, at least a portion of the supporting frame is disposed between the first supporting surface and the second supporting surface, thereby forming a step difference between the first supporting surface and the second supporting surface.

An inter-connector for connecting a first unit cell to a second unit cell in series, the inter-connector comprising: a fixing wall dimensioned and configured to receive an outer wall of a first unit cell therein, and comprising a first welding projection operable to be welded to the first unit cell; a first supporting surface formed on the fixing wall, and dimensioned and configured to support an electrode surface of the first unit cell; and a second supporting surface dimensioned and configured to support an electrode surface of the second unit cell, wherein the thickness of a welding projection surrounding area of the fixing wall is equal to or thinner than an anode outer wall of a unit cell.

Some embodiments further comprise a step wall disposed between the first supporting surface and the second supporting surface, thereby forming a step between the first supporting surface and the second supporting surface.

In some embodiments, the electrode surface of the first unit cell comprises an anode, and the electrode surface of the second unit cell comprises a cathode. In some embodiments, a ratio of a height to a width of the first welding projection is from about 15% to about 20%. In some embodiments, the second supporting surface comprises a second welding projection operable to be welded to the second unit cell.

Some embodiments provide an inter-connector for connecting a first unit cell to a second unit cell in series, the inter-connector comprising: a fixing wall dimensioned an configured to receive an outer wall of a first unit cell therein; a first supporting surface formed on the fixing wall, and dimensioned and configured to support an electrode surface of the first unit cell; and a second supporting surface dimensioned and configured to support an electrode surface of a second unit cell, the second supporting surface comprising a welding projection operable to be welded to the second unit cell, wherein the thickness of a welding projection surrounding area of the second supporting surface is equal to or thinner than an anode outer wall of a unit cell.

Some embodiments further comprise a step wall disposed between the first supporting surface and the second supporting surface, thereby generating a step between the first supporting surface and the second supporting surface.

In some embodiments, the electrode surface of the first unit cell comprises an anode, and the electrode surface of the second unit cell comprises a cathode. In some embodiments, a ratio of a height to a width of the welding projection is from about 15% to about 20%.

Some embodiments provide a serial cell comprising: a plurality of unit cells; and an inter-connector coupling a lower portion of a first unit cell and an upper portion of a second unit cell. The inter-connector comprises: a supporting frame mechanically coupling the first unit cell and the second unit cell; a welding projection operable to be welded to one of the first unit cell or the second unit cell; and a welding projection surrounding area disposed between the welding projection and the supporting frame. At least a portion of the supporting frame is thicker than the welding projection surrounding area, and at least a portion of the welding projection is thicker than the welding projection surrounding area.

In some embodiments, at least a portion of the supporting frame is thicker than an outer wall of a unit cell and a thickness of the welding projection surrounding area equal to or thinner than the outer wall of the unit cell. In some embodiments, a ratio of a height to a width of the welding projection is from about 15% to about 20%.

Some embodiments further comprise a spacer dimensioned and configured to prevent short-circuit of the unit cell by the inter-connector.

Some embodiments further comprise a first cap assembly disposed on the upper part of the top unit cell; and a second cap assembly placed on the lower part of the bottom unit cell.

BRIEF DESCRIPTION OF THE DRAWINGS

These and/or other aspects and advantages will become apparent and more readily appreciated from the following description of some preferred embodiments, taken in conjunction with the accompanying drawings of which.

DETAILED DESCRIPTION OF PREFERRED EMBODIMENTS

Hereinafter, preferred embodiments, wherein a person having ordinary skill in the art can easily carry out the present invention, will be described in a more detailed manner with reference to the accompanying drawings. However, one skilled in the art will understand that changes in many different forms are possible and that the disclosure should not be construed as limited to the embodiments set forth herein.

In some embodiments, a serial interface comprises an inter-connector suitable for mechanically fixing and conductably coupling two cylindrical unit cells in series; and optionally, a spacer coupled to the inter-connector, suitable for preventing a short-circuit. Among others, in one aspect, the inter-connector comprises at least one metal material suitable for weldingly fixing the two cylindrical unit cells. In some embodiments of the serial interface not comprising a spacer, the inter-connector forms the serial interface. In some embodiments, an upper part of a top unit cell 40 of a serial cell 30 is a first cap assembly, and the lower part of a bottom unit cell 30 is coupled to a second cap assembly. When a module-type cell 10 comprises a plurality of serial cells 30 in a case, the first and second cap assemblies can function to couple these serial cells 30 to the case.

Figure 2A:
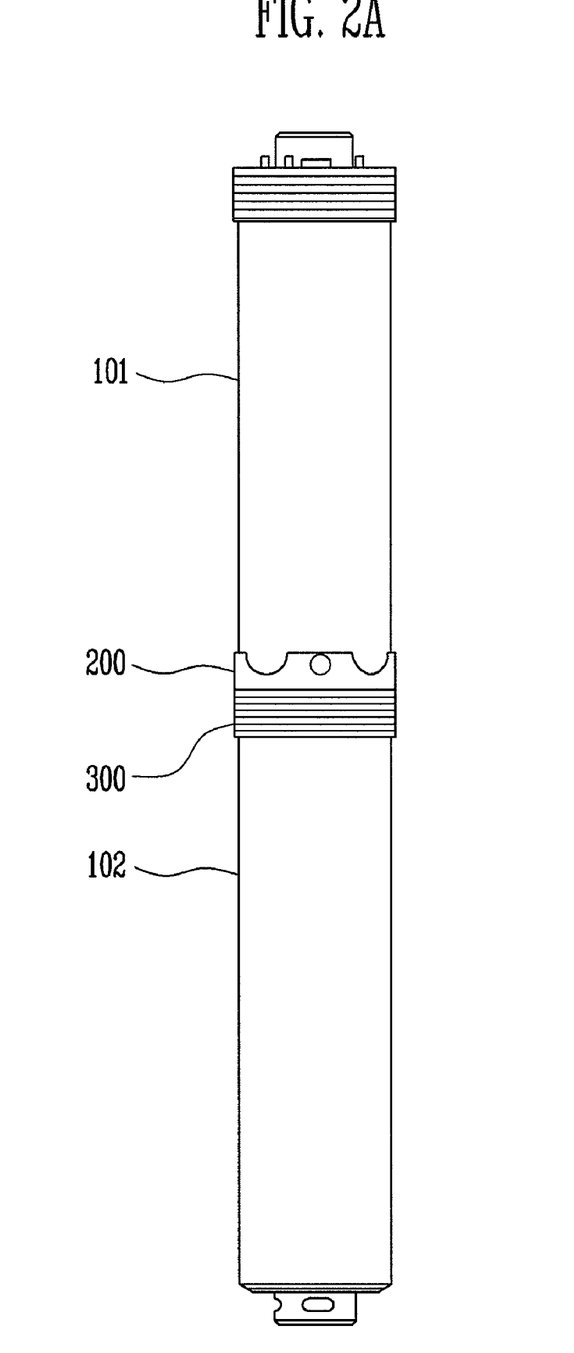
FIG. 2A is a side view of a cylindrical serial cell comprising an embodiment of inter-connector.
Figure 2B:
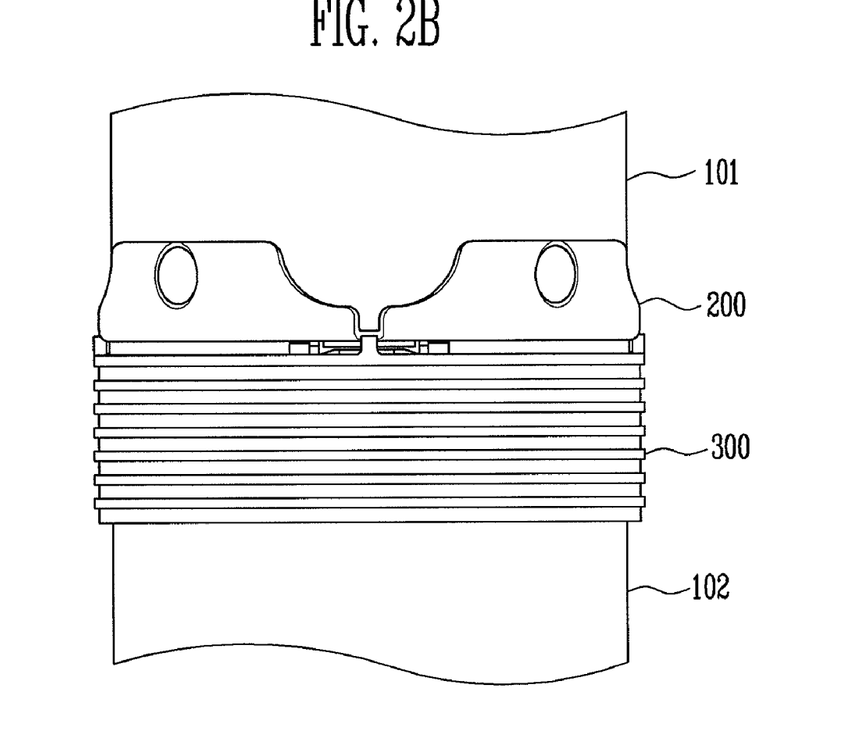
FIG. 2B is an enlarged view of the inter-connector region of the FIG. 2A.
Figure 2C:
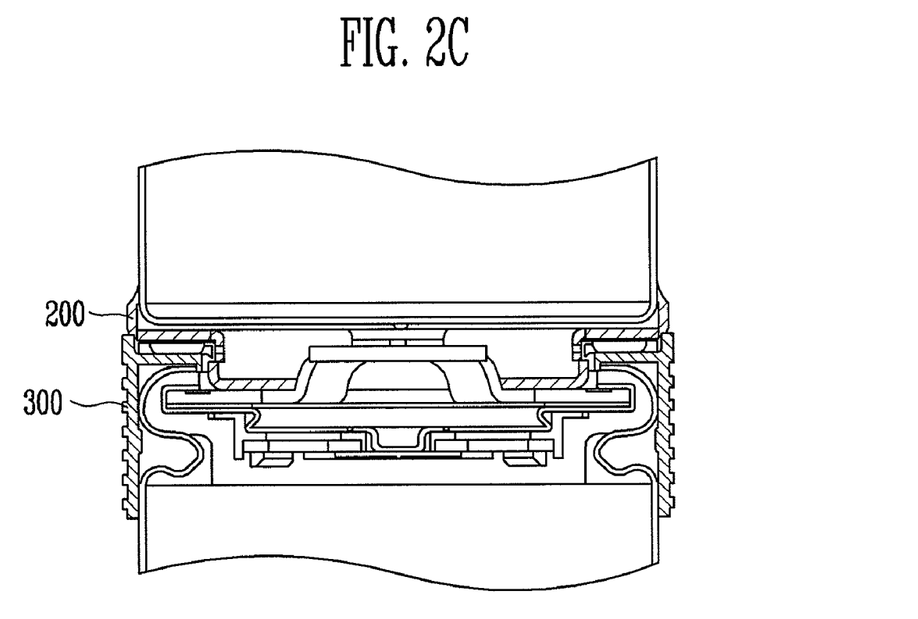
FIG. 2C is a cross-sectional view of the region of FIG. 2B.

FIG. 2A shows a side view of a cylindrical serial cell comprising an embodiment of a serial inter-connector. FIG. 2B shows a detail view of the serial inter-connector region of the FIG. 2A. FIG. 2C shows a cross-section of the internal structure of the detail illustrated in FIG. 2B.

The serial interface of the cylindrical serial cell shown in FIGS. 2A and 2B comprises an inter-connector 200 and a spacer 300 interposed between two cylindrical unit cells 101 and 102. The inter-connector 200 forms an upper part and the spacer 300 forms a lower part of the serial interface.

In the illustrated embodiment, the inter-connector 200 conductively couples an anode outer wall of the first cylindrical unit cell 101 and a cathode terminal of the second cylindrical unit cell 102 to each other. The spacer 300 located between the inter-connector 200 and the anode outer wall of the second cylindrical unit cell 102 is dimensioned and configured to prevent a short-circuit arising from movement of the inter-connector 200.

The outer wall of the spacer 300 can have a larger circumference than the cylindrical unit cells 101 and 102, which facilitates cooling of the cylindrical unit cells 101 and 102 by forming space between an outer wall of the cylindrical unit cells 101 and 102, and an inner wall of a module cell frame in which the cylindrical serial cells are disposed.

Figure 3:
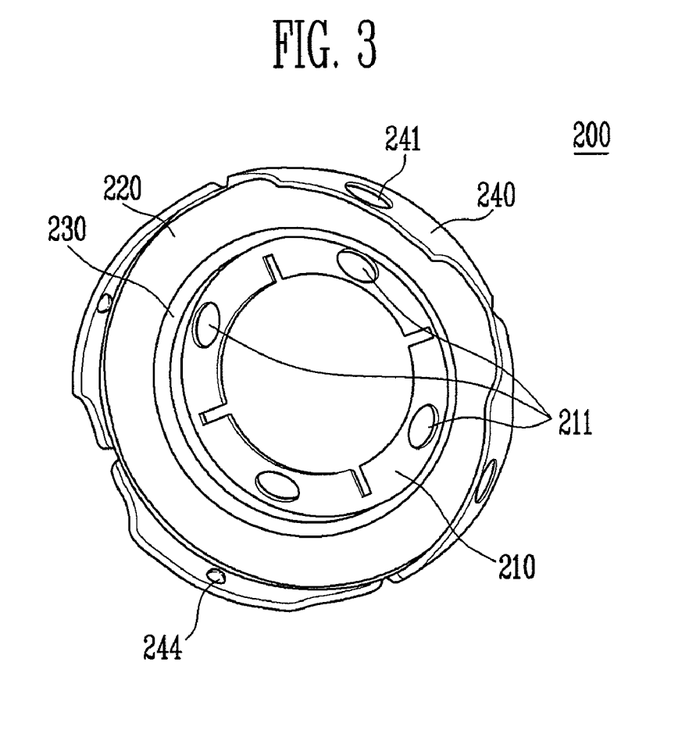
FIG. 3 is a perspective view of an embodiment of an inter-connector.
Figure 4A:
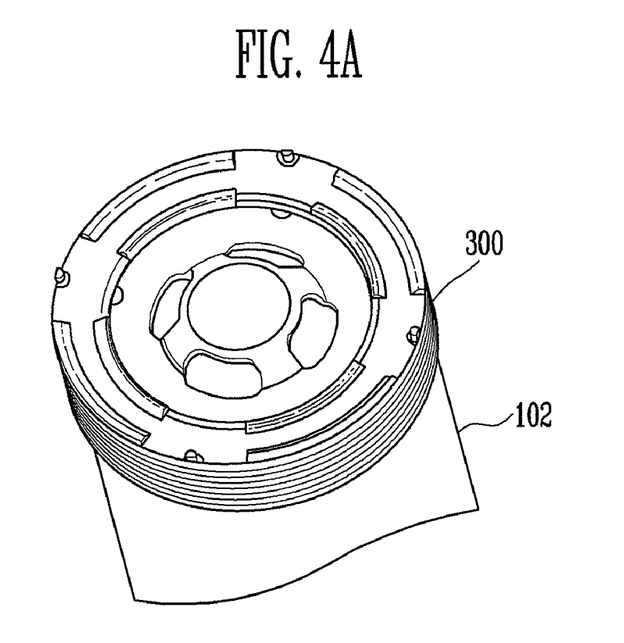
FIG. 4A is a perspective view of an embodiment of a spacer comprising the inter-connector of FIG. 2B coupled with a cylindrical unit cell.
Figure 4B:
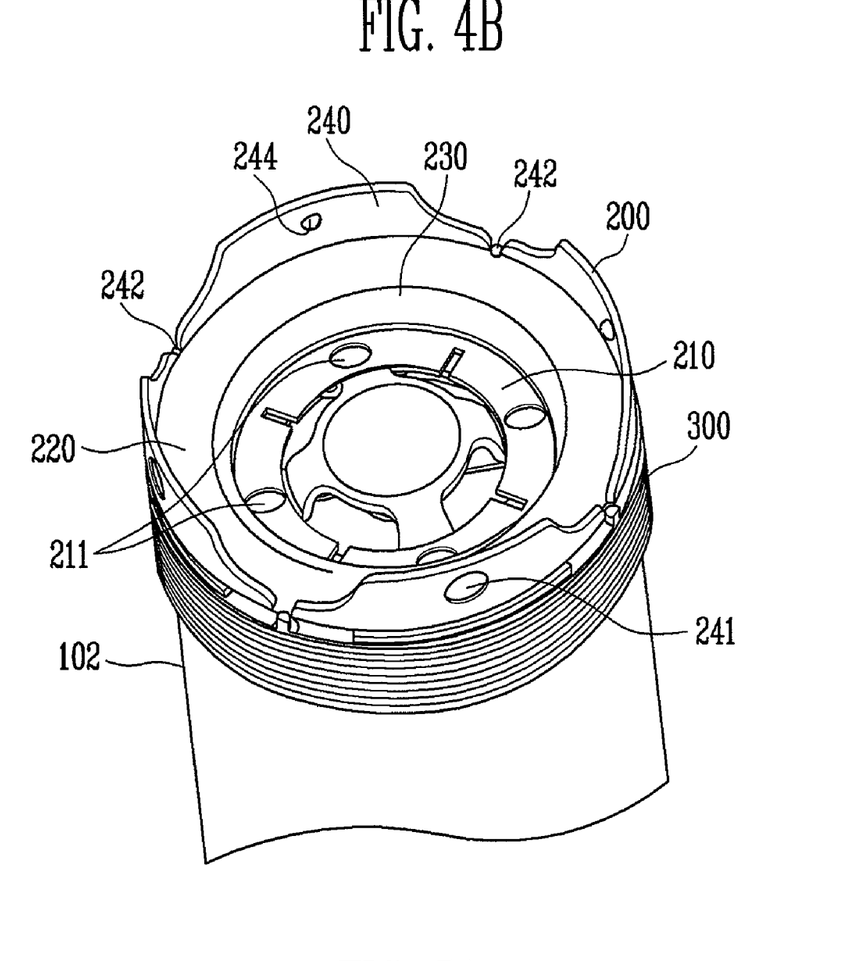
FIG. 4B is a perspective view illustrating an inter-connector coupled with the upper part of an spacer, which as shown in FIG. 4A is coupled with the upper part of a cylindrical unit cell.

FIG. 3 shows a perspective view of an embodiment of an inter-connector 200, FIG. 4A shows in perspective an embodiment of a spacer 300 coupled to cylindrical unit cell 102. FIG. 4B shows in perspective an embodiment of an inter-connector 200 coupled with the upper part of the spacer 300, which, as illustrated in FIG. 4A, is coupled with the upper part of the cylindrical unit cell 102. The illustrated embodiment of the spacer 300 insulates a first supporting surface 220 of the inter-connector from the anode outer wall of the second unit cell 102.

The inter-connector 200 shown in FIG. 3 comprises a generally ring-shaped fixing wall 240 dimensioned and configured to receive therein the anode outer wall of the first cylindrical unit cell 101 and a first welding projection 244 positioned and configured for welding to the first cylindrical unit cell 101, for example, by contact resistance welding. A first supporting surface 220 extending inwardly from the fixing wall 240 is dimensioned and configured to contact and support the anode of the first cylindrical unit cell 101. A second supporting surface 210 is dimensioned and configured to contact and support the cathode-end surface of the second cylindrical unit cell 102. In the illustrated embodiment, the second supporting surface 210 comprises a second welding projection 212 suitable for welding to the second unit cell 102, for example, by contact resistance welding. A step wall 230 extends between the first supporting surface 220 and the second supporting surface 210, thereby forming a step between the first supporting surface 220 and the second supporting surface 210 in the illustrated embodiment.

The fixing wall 240, the first supporting surface 220, the second supporting surface 210, and the step wall 230 can be formed in an integrated frame. To provide sufficient strength to the serial interface, the at least a portion of the fixing wall 240 and at least a portion of the second supporting surface 210 are preferably thicker than the outer wall of the cylindrical unit cell, for example, from about 0.4 T to about 0.5 T.

In some embodiments of the fixing wall 240, the thickness of the area 241 surrounding welding projection is about equal to or thinner than the anode outer wall of the first cylindrical unit cell 101, and the first welding projection 244 is thicker than the area 241 surrounding the first welding projection.

Optionally, a thickness of an area 211 of the second supporting surface 210 surrounding the second welding projection 212 is equal to or thinner than area of the cathode-end surface of the unit cell 102 to which it is welded. In some embodiments in which the cathode-end surface of the unit cell 102 is sufficiently thick, for example, at least about 0.8 T, the thickness of the area 211 surrounding the welding projection 212 does not adversely affect weldability. In some embodiments in which the cathode-end surface of the unit cell 102 is thinner than the second supporting surface 210 however, the thinner area surrounding the second welding projection 212 provides a better weld.

Figure 5A:
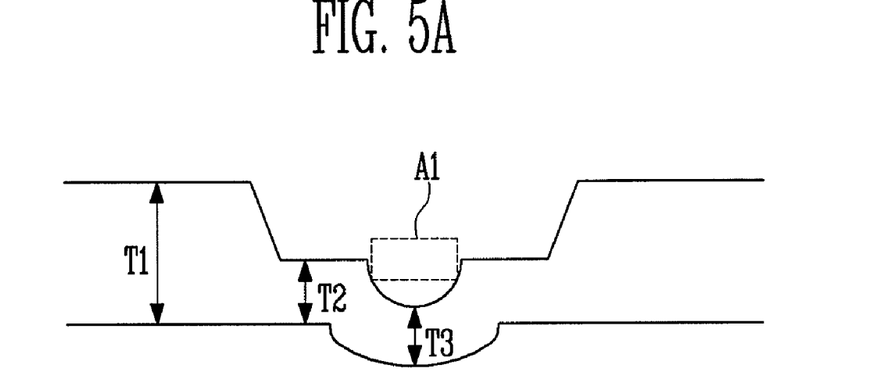
FIG. 5A is a schematic cross-sectional view illustrating a thickness distribution of an embodiment of a fixing wall of the inter-connector of FIG. 3.
Figure 5B:
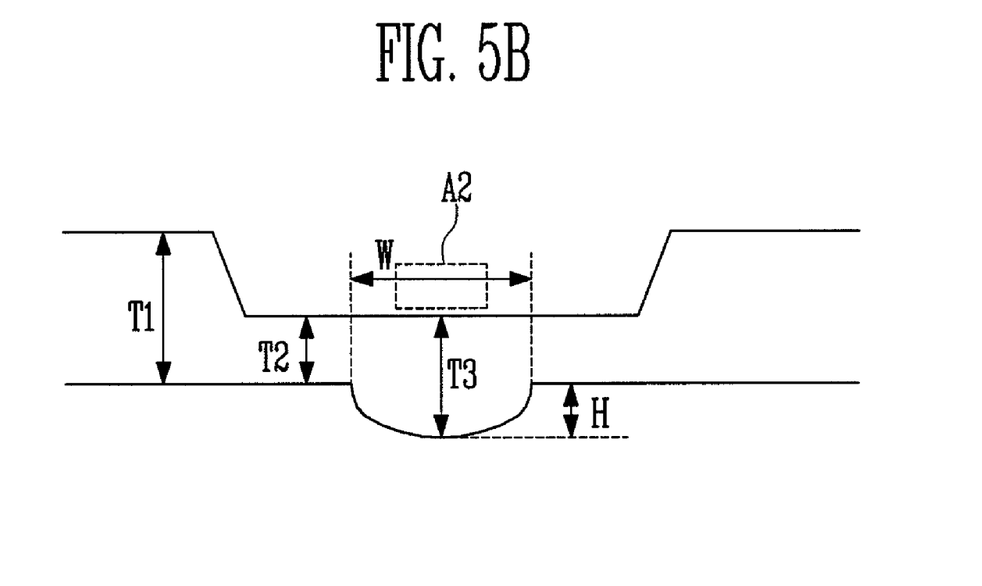
FIG. 5B is a schematic cross-sectional view illustrating a thickness distribution of another embodiment of a fixing wall of the inter-connector of FIG. 3.

FIG. 5A is a schematic cross-sectional view of one embodiment of a thickness profile of the fixing wall 240, and FIG. 5B is a schematic cross-sectional view of another embodiment of a thickness profile of the fixing wall 240 of the inter-connector of FIGS. 3, 4A, and 4B.

In FIGS. 5A and 5B, the thickness of a portion of the fixing wall 240 is T1, the thickness of the welding projection is T3, and the thickness of the welding projection surrounding area is T2. In the illustrated embodiment, T1 is thicker than the outer wall of a unit cell to which the welding projection is to be welded, for example, at lest about 0.6 T.

In the illustrated embodiments, T2 of the welding projection surrounding area is about equal to or thinner than the outer wall of the unit cell 101 to which it will be welded. For example, for a unit cell outer wall about 0.4 T thick, T2 is about 0.4 T or less. For a unit cell outer wall of about 0.5 T, T2 is about 0.5 T or less. The thinning creates a higher resistance for the area 241 surrounding the welding projection 244 compared with the resistance of outer wall of the unit cell 101. Consequently, during welding, a considerable amount of current flows from the welding electrode A2 to the outer wall of the unit cell 101. As a result, although the thickness of the inter-connector 200 is considerable, it is stably welded to a relatively thin outer wall of the unit cell 101. In the embodiment illustrated in FIG. 5A, the thickness T3 of the welding projection 244 is selected to increase its resistance. Contact between the welding electrode and the welding projection 244 is poor, however, as indicated by the contact portion A2 of the welding electrode, causing the welding projection 244 to adhere to the welding electrode. Furthermore, a thinner welding projection 244 can contribute less metal to the weld to the outer wall of the unit cell 101, thereby increasing the likelihood of weld failure.

In the embodiment illustrated in FIG. 5B, the thickness T3 of the welding projection 244 is a sum of the T2 (thickness of the welding projection surrounding area) and the (H (height of the welding projection). One result of the illustrated configuration is improved contact between the contacting portion A2 of the welding electrode and the welding projection 244, thereby improving weldability and preventing adhesion of the welding electrode. Moreover, the projection 244 provides a sufficient amount of metal to provide a secure weld to the outer wall of the unit cell 101.

In some preferred embodiments, a height-to-width ratio (H/W) of the welding projection 244 is from about 15% to about 20%. At higher H/W ratios, the contact area A2 between the welding projection and the outer wall of the unit cell 101 is reduced, thereby reducing the current flowing from the welding electrode to the outer wall of the unit cell 101, which can result in insufficient melting of the welding projection 244, leading to poor weld strength. At lower H/W ratios, the volume of metal in the welding projection 244 is too large, resulting in poor melting during welding.

Figure 6:
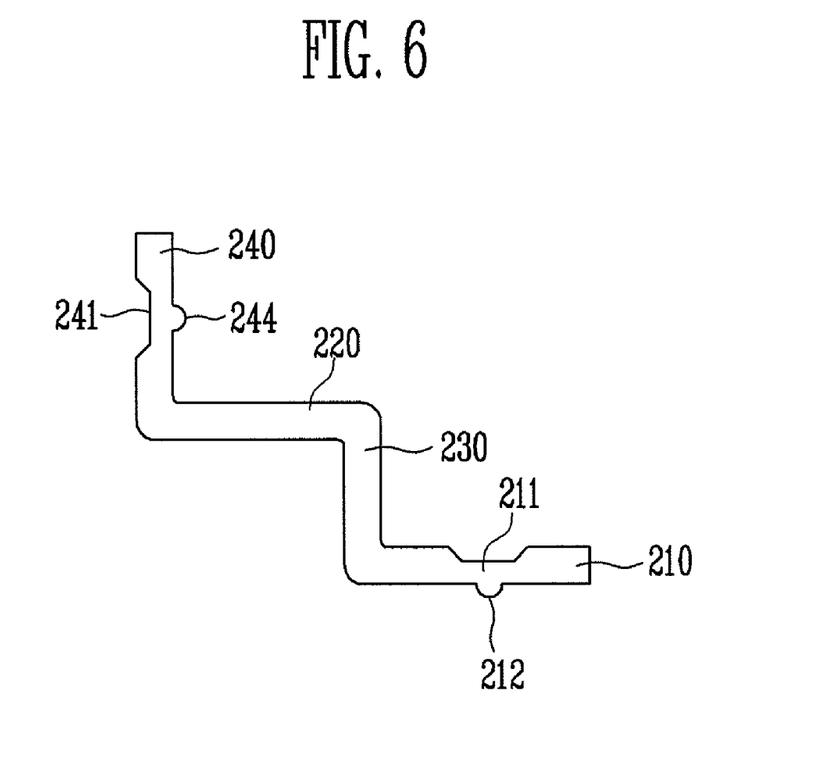
FIG. 6 is a cross-sectional view of an embodiment of the inter-connector of FIG. 3 combined with the thickness distribution illustrated in FIG. 5B.

FIG. 6 is a cross-sectional view of an embodiment of an inter-connector 200 similar to the embodiment illustrated in FIG. 3 in which both the first 244 and the second 212 welding projections and their surrounding area have the structure of FIG. 5. The one-piece frame of the inter-connector 200 comprises a fixing wall 240, a first supporting surface 220, a step wall 230, and a second supporting surface 210, all of which in the illustrated embodiment have generally uniform thicknesses.

The illustrated inter-connector can be welded to an anode outer wall of a cylindrical unit cell 101 inserted into the fixing wall 240 and seated on the first supporting surface 220 by contacting a welding electrode with the first welding projection surrounding area 241 and melting the first welding projection 244 as discussed above. Also as discussed above, in some embodiments in which the cathode outer wall of the cylindrical unit cell 102 is thicker than the frame of the inter-connector 200, the second welding projection and surrounding area need not have the thickness profiles discuss herein.

Embodiments of the serial cell comprising the disclosed inter-connector 200 exhibit improved welds, while assuring sufficient mechanical strength to support the two unit cells. Some embodiments also provide the manufacture of a serial inter-connector with these advantages at low cost.

For example, although a generally cylindrical unit cell comprising a cathode is formed as a terminal and an anode formed as an outer wall of the cell is described above, those skilled in the art will understand that the cathode and the anode may be formed in the opposite arrangement or in other shapes. Those skilled in the art will understand that the serial interface is also applicable to such cells.

Although some embodiments have been shown and described herein, those skilled in the art will appreciate that changes can be made without departing from the principles and spirit of the disclosure, the scope of which is defined in the appended claims and their equivalents.

What is claimed is:

1. An inter-connector comprising:
   a supporting frame dimensioned and configured to mechanically couple two unit cells;
   a welding projection operable to be welded to the unit cells; and
   a welding projection surrounding area disposed between the welding projection and the supporting frame so as to be immediately adjacent the welding projection, wherein
   at least a portion of the supporting frame is thicker than the welding projection surrounding area, and
   at least a portion of the welding projection is thicker than the welding projection surrounding area.

2. The inter-connector as claimed in claim 1, wherein the at least a portion of the supporting frame is thicker than an outer wall of a unit cell and a thickness of the welding projection surrounding area equal to or thinner than the outer wall of the unit cell.

3. The inter-connector as claimed in claim 1, wherein a ratio of a height to a width of the welding projection is from about 15% to about 20%.

4. The inter-connector as claimed in claim 1, wherein the two unit cells comprise a first unit cell and a second unit cell, and the inter-connector is dimensioned and configured to couple the first unit cell to the second unit cell in series.

5. The inter-connector as claimed in claim 4, wherein the supporting frame comprises:
   a fixing wall dimensioned and configured to receive a portion of the first unit cell;
   a first supporting surface formed on the fixing wall dimensioned and configured to support a surface of an electrode of the first unit cell; and
   a second supporting surface dimensioned and configured to contact and support a surface of an electrode of the second unit cell.

6. The inter-connector as claimed in claim 5, wherein the welding projection comprises a first welding projection extending inwardly from the fixing wall, and operable to be welded to the first unit cell.

7. The inter-connector as claimed in claim 5, wherein the electrode surface of the first unit cell comprises an anode, and the electrode surface of the second unit cell comprises a cathode,
   at least a portion of the fixing wall is thicker than an anode outer wall of the first unit cell, and a thickness of the first welding projection surrounding area is equal to or thinner than the anode outer wall of the first unit cell.

8. The inter-connector as claimed in claim 6, wherein the electrode surface of the first unit cell comprises an anode, the electrode surface of the second unit cell comprises a cathode, and
a thickness of the fixing wall is equal to or thinner than that of an anode outer wall of the unit cell.

9. The inter-connector as claimed in claim 5, wherein the welding projection comprises a second welding projection formed on the second supporting surface, and operable to be welded to the second unit cell.

10. The inter-connector as claimed in claim 9, wherein the electrode surface of the first unit cell comprises an anode, and the electrode surface of the second unit cell comprises a cathode,
a thickness of the second welding projection surrounding area is equal to or thinner than the cathode outer wall of the second unit cell.

11. The inter-connector as claimed in claim 5, wherein at least a portion of the supporting frame is disposed between the first supporting surface and the second supporting surface, thereby forming a step difference between the first supporting surface and the second supporting surface.

12. An inter-connector for connecting a first unit cell to a second unit cell in series, the inter-connector comprising:
a fixing wall dimensioned and configured to receive an outer wall of a first unit cell therein, and comprising a first welding projection operable to be welded to the first unit cell;
a first supporting surface formed on the fixing wall, and dimensioned and configured to support an electrode surface of the first unit cell; and
a second supporting surface dimensioned and configured to support an electrode surface of the second unit cell,
wherein the thickness of a welding projection surrounding area that is immediately adjacent the welding projection of the fixing wall is equal to or thinner than an anode outer wall of a unit cell.

13. The inter-connector as claimed in claim 12, further comprising a step wall disposed between the first supporting surface and the second supporting surface, thereby forming a step between the first supporting surface and the second supporting surface.

14. The inter-connector as claimed in claim 12, wherein the electrode surface of the first unit cell comprises an anode, and the electrode surface of the second unit cell comprises a cathode.

15. The inter-connector as claimed in claim 12, wherein a ratio of a height to a width of the first welding projection is from about 15% to about 20%.

16. The inter-connector as claimed in claim 12, wherein the second supporting surface comprises a second welding projection operable to be welded to the second unit cell.

17. An inter-connector for connecting a first unit cell to a second unit cell in series, the inter-connector comprising:
a fixing wall dimensioned an configured to receive an outer wall of a first unit cell therein;
a first supporting surface formed on the fixing wall, and dimensioned and configured to support an electrode surface of the first unit cell; and
a second supporting surface dimensioned and configured to support an electrode surface of a second unit cell, the second supporting surface comprising a welding projection operable to be welded to the second unit cell,
wherein the thickness of a welding projection surrounding area that is immediately adjacent the welding projection of the second supporting surface is equal to or thinner than an anode outer wall of a unit cell and wherein the welding projection is thicker than the welding projection surrounding area.

18. The inter-connector as claimed in claim 17, further comprising a step wall disposed between the first supporting surface and the second supporting surface, thereby generating a step between the first supporting surface and the second supporting surface.

19. The inter-connector as claimed in claim 17, wherein the electrode surface of the first unit cell comprises an anode, and the electrode surface of the second unit cell comprises a cathode.

20. The inter-connector as claimed in claim 17, wherein a ratio of a height to a width of the welding projection is from about 15% to about 20%.

21. A serial cell comprising:
a plurality of unit cells; and
an inter-connector coupling a lower portion of a first unit cell and an upper portion of a second unit cell,
wherein the inter-connector comprises:
a supporting frame mechanically coupling the first unit cell and the second unit cell;
a welding projection operable to be welded to one of the first unit cell or the second unit cell; and
a welding projection surrounding area disposed between the welding projection and the supporting frame so as to be immediately adjacent the welding projection, wherein
at least a portion of the supporting frame is thicker than the welding projection surrounding area, and
at least a portion of the welding projection is thicker than the welding projection surrounding area.

22. The serial cell equipped the inter-connector as claimed in claim 21, wherein at least a portion of the supporting frame is thicker than an outer wall of a unit cell and a thickness of the welding projection surrounding area equal to or thinner than the outer wall of the unit cell.

23. The serial cell equipped the inter-connector as claimed in claim 21, wherein a ratio of a height to a width of the welding projection is from about 15% to about 20%.

24. The serial cell equipped the inter-connector as claimed in claim 21, further comprising a spacer dimensioned and configured to prevent short-circuit of the unit cell by the inter-connector.

25. The serial cell equipped the inter-connector as claimed in claim 21, further comprising a first cap assembly disposed on the upper part of the top unit cell; and a second cap assembly placed on the lower part of the bottom unit cell.

* * * * *